M. W. RUSSELL.
MOLE TRAP.
APPLICATION FILED MAY 4, 1915.
1,165,209.
Patented Dec. 21, 1915.
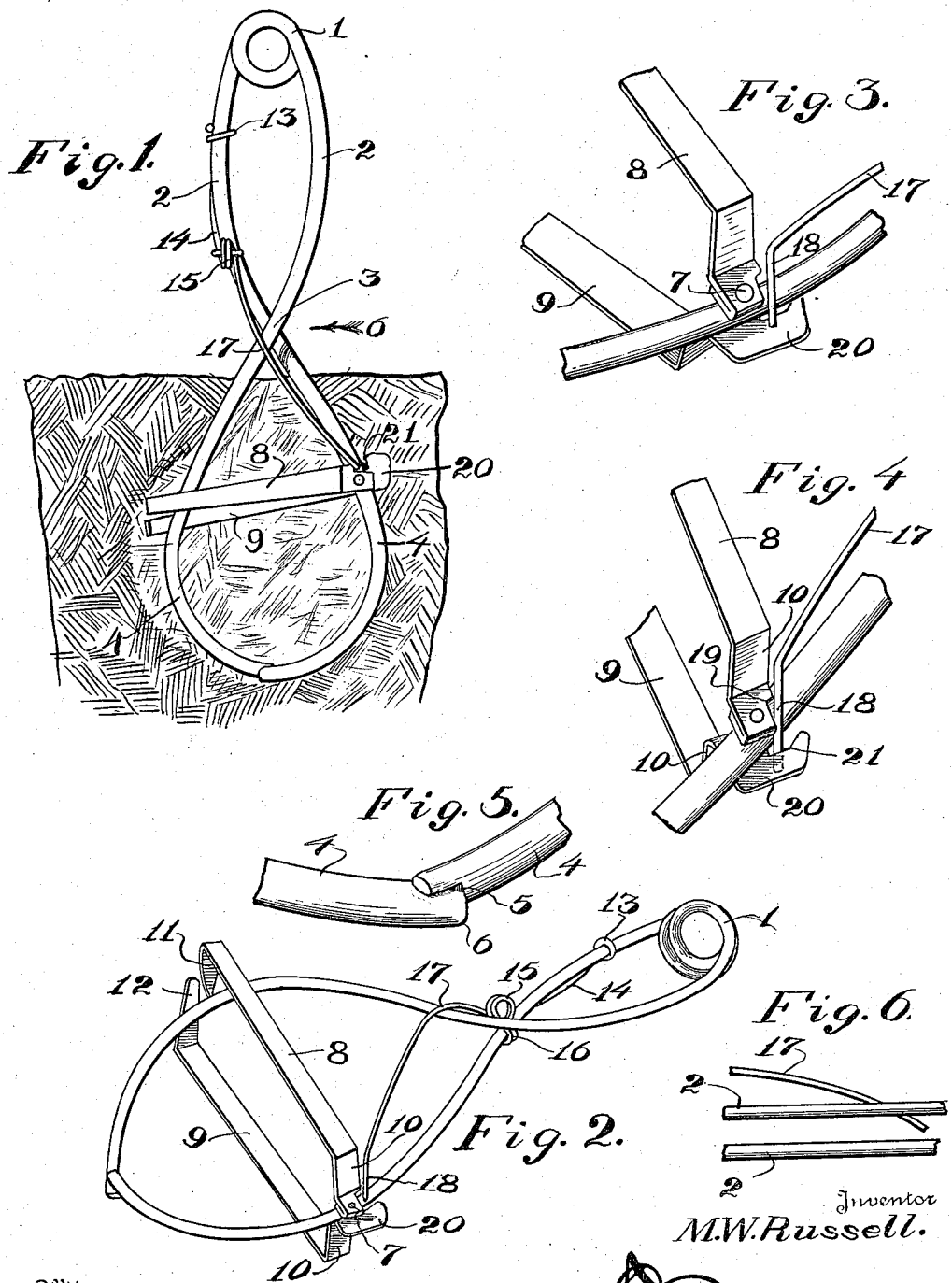
M. W. Russell.

UNITED STATES PATENT OFFICE.

MANNING W. RUSSELL, OF KEATCHIE, LOUISIANA, ASSIGNOR OF ONE-HALF TO VIRGIL M. RICH, OF KEATCHIE, LOUISIANA.

MOLE-TRAP.

1,165,209.   Specification of Letters Patent.   Patented Dec. 21, 1915.

Application filed May 4, 1915. Serial No. 25,738.

*To all whom it may concern:*

Be it known that I, MANNING W. RUSSELL, a citizen of the United States, residing at Keatchie, in the parish of De Soto and State of Louisiana, have invented certain new and useful Improvements in Mole-Traps; and I do hereby declare the following to be a full, clear, and exact description of the invention, such as will enable others skilled in the art to which it appertains to make and use the same.

This invention relates to mole traps, and one of the principal objects of the invention is to provide a mole trap of simple construction which is adapted to be set within the run of the mole and to be operated and sprung by the mole in passing through the run.

Another object of the invention is to improve the trigger construction illustrated in my Patent, No. 1,135,052, and dated April 13, 1915. In the patent referred to, the trigger was operated by a cord or string extending across between the set jaws of the trap, and the trigger construction of the present application is regarded as more reliable in operation, and also insures that the mole shall be fully within the jaws of the trap before they are sprung.

The foregoing and other objects and advantages may be attained by means of the construction illustrated in the accompanying drawing, in which—

Figure 1 is a side elevation of the trap set and placed in the run of the mole, Fig. 2 is a perspective view of the trap in set condition, Fig. 3 is a detail perspective view showing the operation of the triggers after one of said triggers has been operated by the mole, Fig. 4 is a similar view showing the positions as shown by the parts when the second trigger member has been operated by the mole, Fig. 5 is a perspective view of the ends of the jaw member in set condition, and Fig. 6 is a fragmentary view at the point of crossing of the two jaw members, looking in the direction of arrow 6 in Fig. 1.

Referring to the drawing, the numeral 1 designates a plurality of coils formed in a single strand of spring wire of the desired gage, and extending from opposite sides of the coil 1 are the curved arms 2. The arms 2 cross at the point 3, and are continued to form the curved jaw members 4 of the trap. At the ends of the jaw members 4, one of said members is provided with a recess 5, or a portion of the member at the end is removed and provided with a shoulder, while the end of the other member is rounded off as at 6, so that when the two members are brought together as shown in Fig. 5, the jaws of the trap will remain separated but can be easily sprung apart to close on a mole passing through a run.

Pivotally connected at 7 are two trigger members 8 and 9, each of said trigger members being bent outward from the jaw members 4, as shown at 10 and at the opposite free ends of the members 8 and 9 are fingers 11 and 12.

Connected to one of the members 2 of the trap is a spring bent around the member 2 as 13, extended along the member 2 as shown at 14 and provided with a plurality of coils 15, which are connected to the opposite member of the trap as shown at 16. From this point, the spring is bent to pass over the jaw members at or near the point of crossing as shown at 17. The spring is extended and provided with an angular finger 18.

When the trap is set, and the two ends of the jaw members are engaged as shown in Fig. 5, the finger 18 will rest on top of one of the jaw members as shown in Figs. 1 and 2. Should a mole pass through the run and engage the member 8 and raise it slightly, the shoulder 19 of the member 8 will push the finger 18 off the member 4 of the trap to rest upon the extended portion 20 of the member 9, as shown more clearly in Fig. 3 of the drawing. When the mole continues through the run and raises the member 9, the finger 18 will snap through into the opening 21, and the springs 17 will then exert pressure upon the jaw member at the point of crossing and separate the ends of the jaw members to spring the trap.

From the foregoing it will be obvious that when a mole is coming in either direction, the trap will not spring until both of the members 8 and 9 have been raised to admit the finger 18 in the recess 21 of the member 9.

Various changes may be made in the details of construction without departing from the spirit and scope of the invention as defined in the claims.

What is claimed is:—

1. A mole trap comprising a single length of spring wire having a coil and extended members crossing each other and formed into jaws, the ends of said jaw members adapted to engage to set the trap, two trigger members pivoted to one of the jaw members and extending across and beyond the other member, and a spring wire connected to one of the members and having a finger, said finger being moved by the trigger members to operate the spring jaws to spring the trap.

2. A mole trap made from a single length of spring wire and provided with a coil, oppositely extending portions, crossed one upon the other and provided with curved trap jaws, trigger members pivoted to one of the jaws and extending beyond the other, said trigger members one having a shoulder, and the other a recess, and a spring connected to one of the members of the trap and extending over the other member and provided with a finger, adapted to be operated by the trigger to spring the trap.

3. A mole trap comprising a single length of spring wire provided with cross members and curved jaws, one of said jaws having a recess to receive the end of the other jaw to set the trap, trigger members pivoted to one of the jaw members and extending beyond the other, said trigger members being provided one with a shoulder and the other with an extended portion and recess and a spring connected to one of the members and bearing against the other, said spring having a finger to be operated by the shoulder of one of the trigger members and to pass into the recess of the other member to spring the trap.

In testimony whereof I affix my signature in presence of two witnesses.

MANNING W. RUSSELL.

Witnesses:
F. O. SPIEKER,
A. PERICONE.

Copies of this patent may be obtained for five cents each, by addressing the "Commissioner of Patents, Washington, D. C."